(12) United States Patent
Venzke

(10) Patent No.: US 7,423,514 B2
(45) Date of Patent: Sep. 9, 2008

(54) CONSTANT-POWER CONSTANT-TEMPERATURE RESISTIVE NETWORK

(75) Inventor: Stephen Bolin Venzke, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 175 days.

(21) Appl. No.: 11/446,310

(22) Filed: Jun. 2, 2006

(65) Prior Publication Data

US 2006/0220782 A1    Oct. 5, 2006

Related U.S. Application Data

(62) Division of application No. 10/775,631, filed on Feb. 10, 2004, now Pat. No. 7,081,805.

(51) Int. Cl.
*H01C 1/02* (2006.01)
(52) U.S. Cl. .......................... 338/260; 338/23; 338/319; 333/81 R; 361/766
(58) Field of Classification Search ................. 338/260, 338/81 A, 81 B, 81 R, 239, 23–24, 221, 216, 338/319–320; 333/81 R, 81 A, 81 B; 361/766, 361/93.1–93.2, 78, 91
See application file for complete search history.

(56) References Cited

U.S. PATENT DOCUMENTS

| | | | | | |
|---|---|---|---|---|---|
| 2,378,873 | A | * | 6/1945 | Thompson | 323/353 |
| 3,581,811 | A | * | 6/1971 | Loebe | 165/285 |
| 3,798,413 | A | * | 3/1974 | Kahn | 219/210 |
| 3,995,413 | A | * | 12/1976 | Lynch | 56/119 |
| 4,339,743 | A | * | 7/1982 | Ludwig | 338/206 |
| 4,647,896 | A | * | 3/1987 | Ratell | 338/22 R |
| 5,332,981 | A | * | 7/1994 | Mazzochette et al. | 333/81 R |
| 5,379,190 | A | * | 1/1995 | Hanamura et al. | 361/766 |
| 5,821,505 | A | * | 10/1998 | Tustaniwskyj et al. | 219/494 |
| 5,999,064 | A | * | 12/1999 | Blacka et al. | 333/81 R |
| 6,326,677 | B1 | * | 12/2001 | Bloom et al. | 257/638 |
| 6,801,439 | B2 | * | 10/2004 | Kambara | 361/766 |

* cited by examiner

*Primary Examiner*—K. Richard Lee

(57) ABSTRACT

A thermally stabilized device is described. Single or multiple input ports are accommodated and single and multiple power ports are described. The variation of resistance of a resistor subject to varying power dissipations is minimized by injecting complementary power dissipation and thermally linking it to the resistor. In this manner the temperature of a resistor may be maintained constant even though it dissipates varying amounts of power.

3 Claims, 2 Drawing Sheets

CONSTANT-POWER CONSTANT-TEMPERATURE RESISTIVE NETWORK

This is a Divisional of application Ser. No. 10/775,631, filed on Feb. 10, 2004, now U.S. Pat. No. 7,081,805, the entire disclosure of which is incorporated herein by reference.

FIELD OF THE INVENTION

This invention relates generally to the field of electronic components. More particularly, this invention relates to a resistor or a dissipative network where resistance change resulting from self-heating is objectionable.

BACKGROUND

The variability of electronic component characteristics with environmental changes is basic to practical applied electricity. The performance of electrical and electronic circuits depends directly on constituent component characteristics, such as resistance and capacitance, and when these characteristics change as a result of temperature or humidity operation of the parent circuit also changes.

There are many characteristics of electronic components which are commonly of interest to the designer. As an example, a resistor has characteristics such as resistance, tolerance, operating temperature range, power rating versus temperature, inductance, capacitance, temperature coefficient, humidity, aging, and so forth. Capacitors and inductors have similar performance characteristics, as do transistors and diodes and in general every electrical and electronic component.

A common example is a circuit where the frequency or a voltage level may depend on the value of resistance of a specific resistor. If the value of resistance changes the frequency or voltage also changes. This may not be what the designer intends, as in many cases such variability causes unacceptable circuit operation. Attempts to rectify this problem may range from securing if possible a better grade resistor to a complete circuit redesign.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
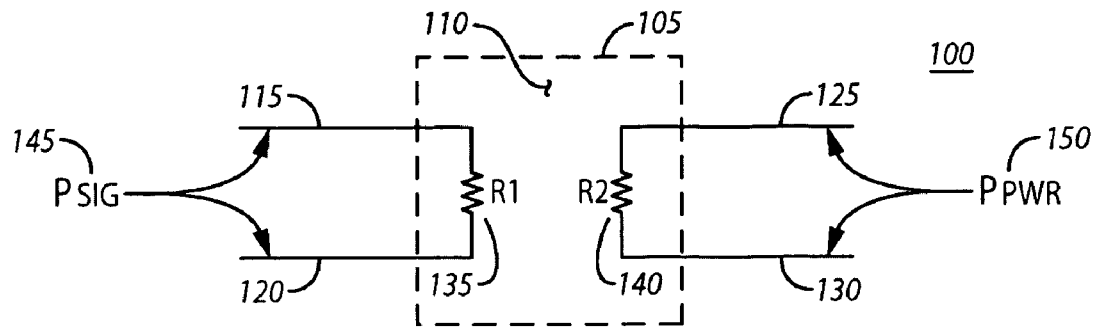
FIG. 1 is an exemplary simplified block diagram of a thermally stabilized device with one signal port and one power port, in accordance with certain embodiments of the present invention.

A method and structure for automatically keeping a resistor or a dissipative network at a constant temperature increment above ambient is presented, in accordance with certain embodiments of the present invention. This is achieved by maintaining the power dissipated in the thermally stabilized device at a constant total value.

Many variations, equivalents and permutations of these illustrative exemplary embodiments of the invention will occur to those skilled in the art upon consideration of the description that follows. The particular examples above should not be considered to define the scope of the invention. For example networks containing large numbers of resistors may be stabilized using techniques of the present invention. A further example would be a network which contains electrical components other than resistors (a dissipative network). Another example would be not calculating total network power as the summation of all signal component powers, but including only the most significant. A still further example would be including active devices in the network wherein power dissipated in these devices may or may not be included in the power calculations.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

For purposes of this document, the exact mechanical and electrical parameters of equipments are unimportant to an understanding of the invention, and many different types of electrical and mechanical components may be utilized without departing from the spirit of the invention. An example is that resistors utilized in the network may differ as to power rating and physical size. This document uses generalized descriptions by way of example only. Many variations for these constituent items are possible without departing from the spirit and scope of the invention.

Refer to FIG. 1, which is an exemplary simplified block diagram of a thermally stabilized device with one signal port and one power port, in accordance with certain embodiments of the present invention. Resistor 135 receives power from signal port 145. This power may be AC, DC, or a combination thereof. Signal port 145 consists of high signal line 115 and low signal line 120, and the signal applied to the port is the difference between these two lines. The power that signal port 145 delivers to resistor 135 is known or measured. The power may be known versus time due to system design characteristics, or it may be measured at desired points in time using established techniques available in the industry Resistor 140 receives power from power port 150. This power may be AC, DC, or a combination thereof. Power port 150 consists of high power line 125 and low power line 130, and the signal applied to the port is the difference between these two lines. The power that power port 150 will deliver to resistor 140 is known or calculated, as will be explained later.

Thermally stabilized device 105 contains resistor 135, resistor 140, and thermal linking agent 110. The purpose of thermal linking agent 110 is to provide low thermal resistance between resistor 135 and resistor 140. This may be accomplished in a number of ways, such as thermal compound, a common substrate, a common heat sink, physical contact between resistors, or any combination of these. There are many thermal management techniques available in the industry. Physical co-location of resistors is not required given adequate thermal linking.

The maximum and minimum power to be dissipated in resistor 135 must be known, measured, or assumed. These powers may be known from system design characteristics, or may be measured under maximum and minimum power conditions using techniques known to the industry. In operation as maximum and minimum power dissipations occur in resistor 135 the temperature of resistor 135 varies. This variation of temperature will cause resistor 135 to change resistance and possibly affect loading on signal port 145, which in turn may introduce errors. For example, if the current through resistor 135 is to be measured, any variation of resistance will produce a variation in current thus introducing a measurement error. If the temperature of resistor 135 can be maintained constant, the resistance will remain constant and this problem may be avoided. To accomplish this, complementary power is applied to resistor 140 in a manner such that the power dissipated in the combination of resistor 135 and resistor 140 is a constant. If the total power dissipated is constant, and if thermal linking agent 110 is utilized, the operational temperature of each resistor will be constant and equal. If the temperature of resistor 135 is maintained constant its resistance will remain constant. As an example, assume that resistor 135 operates between 1 watt and 10 watts power dissipation. A constant power dissipation for the overall device will occur if resistor 140 is caused to dissipate between 9 watts and 0 watts in a manner such that the total power is always 10 watts. In other words, Pdiss140=10−Pdiss135 and the total power dissipated will always be 10 watts. A value larger than the maximum dissipation of resistor 135 may also be chosen, such as Pdiss140=35−Pdiss135 wherein resistor 140 would dissipate between 34 watts and 25 watts depending on the value of dissipation in resistor 135, and the total power dissipated would be constant at 35 watts, and the temperature for both resistors would remain constant. Note that ambient temperature variations are not corrected. The minimum power can optionally be used to improve overall device efficiency since that power is always present and does not need to be supplied at the power port.

Figure 2:
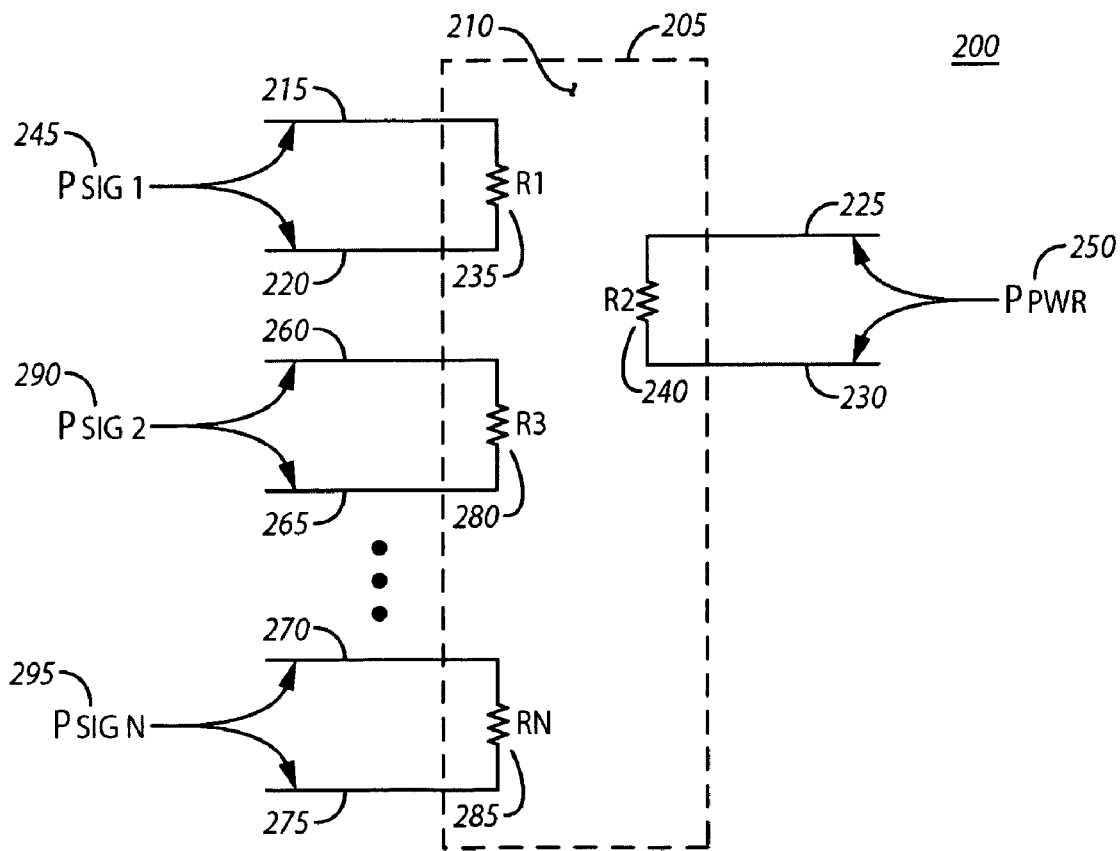
FIG. 2 is an exemplary block diagram of a thermally stabilized device with up to N signal ports and one power port, in accordance with certain embodiments of the present invention.

Refer to FIG. 2, which is an exemplary block diagram of a thermally stabilized device with up to N signal ports and one power port, in accordance with certain embodiments of the present invention. Resistor 235 receives power from signal port 245. This power may be AC, DC, or a combination thereof. Resistor 280 receives power from signal port 290. This power may be AC, DC, or a combination thereof. Resistor 285 receives power from signal port 295. This power may be AC, DC, or a combination thereof. Signal port 245 consists of high signal line 215 and low signal line 220, and the signal applied to the port is the difference between these two lines. Signal port 290 consists of high signal line 260 and low signal line 265, and the signal applied to the port is the difference between these two lines. Signal port 295 consists of high signal line 270 and low signal line 275, and the signal applied to the port is the difference between these two lines. There may be any number of signal power resistors, designated by resistor 235, resistor 280 . . . resistor 285, and are shown as R1, R3 . . . Rn in the figure for clarity. The power signal port 245 delivers to resistor 235 is known or measured. The power may be known versus time due to system design characteristics, or it may be measured at desired points in time using established techniques available in the industry. The power signal port 290 delivers to resistor 280 is known or measured. The power may be known versus time due to system design characteristics, or it may be measured at desired points in time using established techniques available in the industry. The power signal port 295 delivers to resistor 285 is known or measured. The power may be known versus time due to system design characteristics, or it may be measured at desired points in time using established techniques available in the industry. Similar descriptions apply to intermediate resistors and signal ports.

Resistor 240 receives power from power port 250. This power may be AC, DC, or a combination thereof. Power port 250 consists of high power line 225 and low power line 230, and the signal applied to the port is the difference between these two lines. The power that power port 250 will deliver to resistor 240 is known or calculated, as will be explained later.

Thermally stabilized device 205 contains resistor 235, resistor 240, resistor 280, resistor 285, all intermediate resistors, and thermal linking agent 210. The purpose of thermal linking agent 210 is to provide low thermal resistance between all resistors in thermally stabilized device 205. This may be accomplished in a number of ways, such as thermal compound, a common substrate, a common heat sink, physical contact between resistors, or any combination of these. There are many thermal management techniques available in the industry. Physical co-location of resistors is not required given adequate thermal linking.

The maximum and minimum power to be dissipated in the combination of resistor 235, resistor 280 . . . resistor 285 and all intermediate resistors must be known, measured, or assumed. These powers may be known from system design characteristics, or may be measured under maximum and minimum power conditions using power measurement techniques known to the industry. In operation as maximum and minimum power dissipations occur in resistor 235, resistor 280 . . . resistor 285, the temperature of the resistors varies. This variation of temperature will cause the resistors to change resistance and affect loading on signal port 245, signal port 290 . . . signal port 295 which in turn may introduce errors. For example, if the current through resistor 280 is to be measured, any variation of resistance will produce a variation in current thus introducing a measurement error. If the temperature of each resistor can be maintained constant, resistance will remain constant and this problem may be avoided. To accomplish this, complementary power is applied to resistor 240 in a manner such that the power dissipated in the combination of resistor 235, resistor 280 . . . resistor 285, and resistor 240 is a constant. If the total power dissipated is constant, and if thermal linking agent 210 is utilized, the operational temperature of each resistor will be constant and equal. If the temperature of any resistor is maintained constant its resistance will remain constant. As an example, assume that signal resistor combination operates between 1 watt and 10 watts power dissipation. A constant power dissipation for the overall device will occur if resistor 240 is caused to dissipate between 9 watts and 0 watts in a manner such that the total power is always 10 watts. In other words, Pdiss240=10−Pdiss(comb) and the total power dissipated will always be 10 watts. A value larger than the total maximum dissipation of the signal resistor combination may also be chosen, such as Pdiss240=35−Pdiss(comb) wherein resistor 240 would dissipate between 34 watts and 25 watts depending on the value of dissipation in the signal resistor combination, and the total power dissipated would be constant at 35 watts with the temperature of all resistors remaining constant. Note that ambient temperature variations are not corrected. The minimum power can optionally be used to improve overall device efficiency since that power is always present and does not need to be supplied at the power port.

Figure 3:
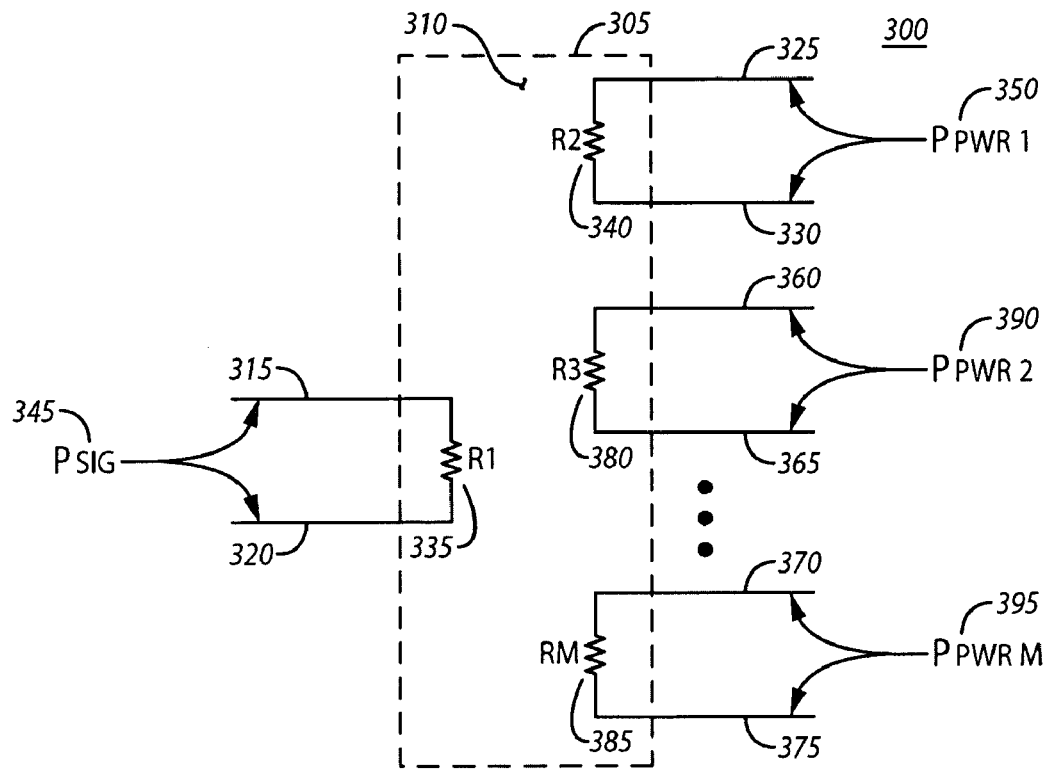
FIG. 3 is an exemplary block diagram of a thermally stabilized device with one signal port and up to M power ports, in accordance with certain embodiments of the present invention.

Refer to FIG. 3, which is an exemplary block diagram of a thermally stabilized device with one signal port and up to M power ports, in accordance with certain embodiments of the present invention. Resistor 335 receives power from signal port 345. This power may be AC, DC, or a combination thereof. Signal port 345 consists of high signal line 315 and low signal line 320, and the signal applied to the port is the difference between these two lines.

Resistor 340 receives power from power port 350. This power may be AC, DC, or a combination thereof. Power port 350 consists of high power line 325 and low power line 330, and the signal applied to the port is the difference between these two lines. The power that power port 350 will deliver to resistor 340 is known or calculated, as will be explained later. Resistor 380 receives power from power port 390. This power may be AC, DC, or a combination thereof. Power port 390 consists of high power line 360 and low power line 365, and the signal applied to the port is the difference between these two lines. The power that power port 390 will deliver to resistor 380 is known or calculated, as will be explained later. Resistor 385 receives power from power port 395. This power may be AC, DC, or a combination thereof. Power port 395 consists of high power line 370 and low power line 375, and the signal applied to the port is the difference between these two lines. The power that power port 395 will deliver to resistor 385 is known or calculated, as will be explained later. Similar descriptions apply to intermediate resistors and power ports.

Thermally stabilized device 305 contains resistor 335, resistor 340, resistor 380, resistor 385, all intermediate resistors, and thermal linking agent 310. The purpose of thermal linking agent 310 is to provide low thermal resistance between all resistors in thermally stabilized device 305. This may be accomplished in a number of ways, such as thermal compound, a common substrate, a common heat sink, physical contact between resistors, or any combination of these. There are many thermal management techniques available in the industry. Physical co-location of resistors is not required given adequate thermal linking.

The maximum and minimum power to be dissipated in resistor 335 must be known, measured, or assumed. This power may be known from system design characteristics, or may be measured under maximum and minimum power conditions using techniques known to the industry. In operation as maximum and minimum power dissipations occur in resistor 335 the temperature of resistor 335 varies. This variation of temperature will cause resistor 335 to change resistance and possibly affect loading on signal port 345, which in turn may introduce errors. For example, if the current through resistor 335 is to be measured, any variation of resistance will produce a variation in current thus introducing a measurement error. If the temperature of resistor 335 can be maintained constant, the resistance will remain constant and this problem may be avoided. To accomplish this, complementary power is applied to the combination of resistor 340, resistor 380 . . . resistor 385 in a manner such that the total power dissipated in the combination plus resistor 335 is a constant. If the total power dissipated is constant, and if thermal linking agent 310 is utilized, the operational temperature of each resistor will be constant and equal. If the temperature of any resistor is maintained constant its resistance will remain constant. As an example, assume that resistor 335 operates between 1 watt and 10 watts power dissipation. A constant power dissipation for the overall device will occur if the combination resistor 340, resistor 380 . . . resistor 385 is caused to dissipate between 9 watts and 0 watts in a manner such that the total power is always 10 watts. In other words, Pdiss(comb)=10−Pdiss335 and the total power dissipated will always be 10 watts. A value larger than the maximum dissipation of resistor 335 may also be chosen, such as Pdiss(comb)=35−Pdiss335 wherein the resistor combination would dissipate between 34 watts and 25 watts depending on the value of dissipation in resistor 335, and the total power dissipated would be constant at 35 watts, and the temperature for all resistors would remain constant. Note that ambient temperature variations are not corrected. The minimum power can optionally be used to improve overall device efficiency since that power is always present and does not need to be supplied at the power ports.

Figure 4:
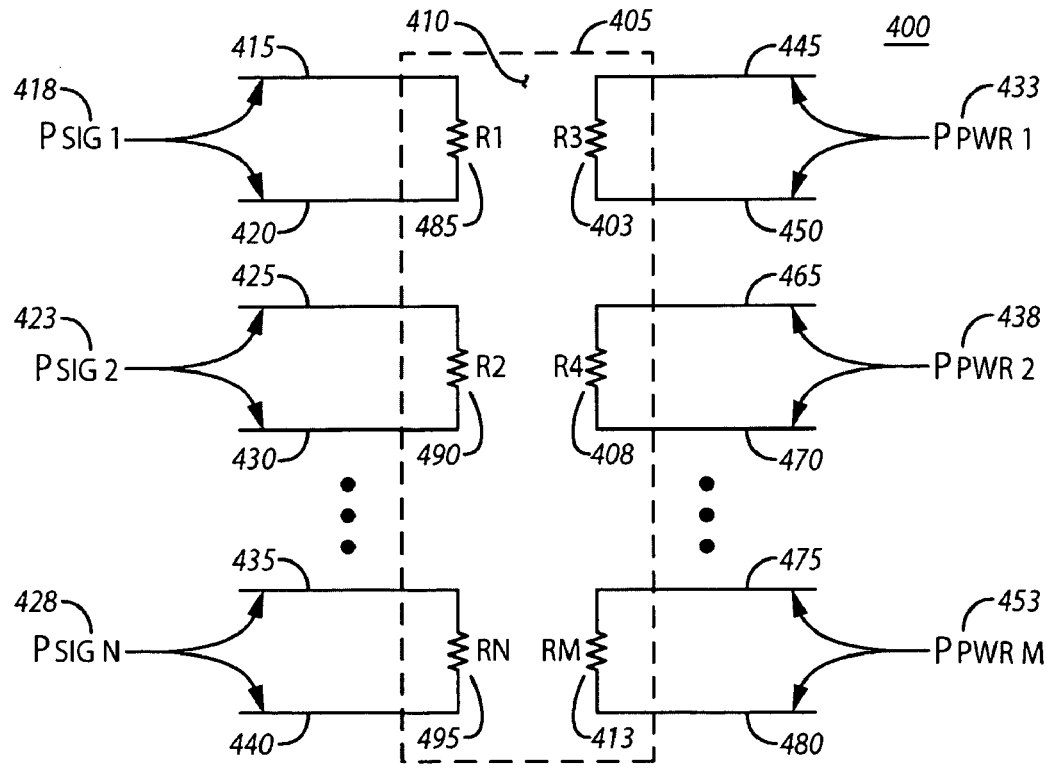
FIG. 4 is an exemplary block diagram of a thermally stabilized device with up to N signal ports and up to M power ports, in accordance with certain embodiments of the present invention.

Refer to FIG. 4, which is an exemplary waveform diagram of a thermally stabilized device with up to N signal ports and up to M power ports, in accordance with certain embodiments of the present invention. Resistor 485 receives power from signal port 418. This power may be AC, DC, or a combination thereof. Resistor 490 receives power from signal port 423. This power may be AC, DC, or a combination thereof. Resistor 495 receives power from signal port 428. This power may be AC, DC, or a combination thereof. Signal port 418 consists of high signal line 415 and low signal line 420, and the signal applied to the port is the difference between these two lines. Signal port 423 consists of high signal line 425 and low signal line 430, and the signal applied to the port is the difference between these two lines. Signal port 428 consists of high signal line 435 and low signal line 440, and the signal applied to the port is the difference between these two lines. There may be any number of signal power resistors, designated by resistor 485, resistor 490 . . . . resistor 495, and is shown as R1, R2 . . . Rn in the figure for clarity. The power that signal port 418 delivers to resistor 485 is known or measured. The power may be known versus time due to system design characteristics, or it may be measured at desired points in time using established techniques available in the industry. The power signal port 423 delivers to resistor 490 is known or measured. The power may be known versus time due to system design characteristics, or it may be measured at desired points in time using established techniques available in the industry. The power signal port 428 delivers to resistor 495 is known or measured. The power may be known versus time due to system design characteristics, or it may be measured at desired points in time using established techniques available in the industry. Similar descriptions apply to intermediate resistors and signal ports.

Resistor 403 receives power from power port 433. This power may be AC, DC, or a combination thereof. Power port 433 consists of high power line 445 and low power line 450, and the signal applied to the port is the difference between these two lines. The power that power port 433 will deliver to resistor 403 is known or calculated, as will be explained later. Resistor 408 receives power from power port 438. This power may be AC, DC, or a combination thereof. Power port 438 consists of high power line 465 and low power line 470, and the signal applied to the port is the difference between these two lines. The power that power port 438 will deliver to resistor 408 is known or calculated, as will be explained later. Resistor 413 receives power from power port 453. This power may be AC, DC, or a combination thereof. Power port 453 consists of high power line 475 and low power line 480, and the signal applied to the port is the difference between these two lines. The power that power port 453 will deliver to resistor 413 is known or calculated, as will be explained later. Similar descriptions apply to intermediate resistors and power ports.

Thermally stabilized device 405 contains resistor 485, resistor 490, resistor 495, resistor 403, resistor 408, resistor

413, all intermediate resistors, and thermal linking agent 410. The purpose of thermal linking agent 410 is to provide low thermal resistance between all resistors. This may be accomplished in a number of ways, such as thermal compound, a common substrate, a common heat sink, physical contact between resistors, or any combination of these. There are many thermal management techniques available in the industry. Physical co-location of resistors is not required given adequate thermal linking.

The maximum and minimum power to be dissipated in the signal resistor combination resistor 485, resistor 490 . . . resistor 495 must be known, measured, or assumed. These powers may be known from system design characteristics, or may be measured under maximum and minimum power conditions using techniques known to the industry. In operation as maximum and minimum power dissipations occur in the signal resistor combination the temperature of its constituent resistors varies. This variation of temperature will cause the resistors to change resistance and possibly affect loading on signal ports 418, 423 . . . 428 which in turn may introduce errors. For example, if the current through resistor 485 is to be measured, any variation of resistance will produce a variation in current thus introducing a measurement error. If the temperature of resistor 485 can be maintained constant, the resistance will remain constant and this problem may be avoided. To accomplish this, complementary power is applied to the power resistor combination resistor 403, resistor 408 . . . resistor 413 in a manner such that the total power dissipated in the signal resistor combination plus the power resistor combination is a constant. If the total power dissipated is constant, and if thermal linking agent 110 is utilized, the operational temperature of each resistor will be constant and equal. If the temperature of resistor is maintained constant its resistance will remain constant. As an example, assume that signal resistor combination operates between 1 watt and 10 watts power dissipation. A constant power dissipation for the overall device will occur if the power resistor combination is caused to dissipate between 9 watts and 0 watts in a manner such that the total power is always 10 watts. In other words, Pdiss (power)=10−Pdiss(signal) and the total power dissipated will always be 10 watts. A value larger than the maximum dissipation of the signal resistor combination may also be chosen, such as Pdiss(power)=35−Pdiss(signal) wherein the power resistor combination would dissipate between 34 watts and 25 watts depending on the value of dissipation in the signal resistor combination, and the total power dissipated would be constant at 35 watts, and the temperature for all resistors would remain constant. Note that ambient temperature variations are not corrected. The minimum power can optionally be used to improve overall device efficiency since that power is always present and does not need to be supplied at the power port.

The merit of a plurality of signal resistors is that multiple signal ports may be simultaneously loaded in a stable manner. Another advantage of accommodating multiple signal resistors is that it may be desirable to use more than one resistor because of component power specification limitations.

The merit of a plurality of power resistors is that using multiple resistors to dissipate power would allow the usage of lower power rating devices. Another advantage would be if different sources, such as AC and DC, were to be utilized simultaneously to provide signals to the power resistors.

A test network was constructed on a ceramic substrate approximately 0.9 inch long×0.3 inch wide×0.02 inch thick. All resistors were thin film deposited on the ceramic surface. The input signal resistor in this case consisted of 2 resistors, a 9.9 megohm and a 100 k ohm to function as a 100:1 voltage divider. The maximum voltage level of measurement for this network was 1000 volts. Without utilizing the present invention, the temperature change of the network was 6 degrees C. when 1000 volts was applied to the network. This temperature rise caused an unacceptable change in output voltage of the 100:1 divider. When the present invention was utilized by adding a power feedback resistor, the temperature change was reduced to approximately 0.6 degree C. The network was then designed for use in a precision digital voltmeter. The present invention could have wide-ranging application whenever self-heating from variable input power causes an unacceptable change in resistance.

Those skilled in the art will appreciate that many other circuit and system configurations can be readily devised to accomplish the desired end without departing from the spirit of the present invention.

While the invention has been described in conjunction with specific embodiments, it is evident that many alternatives, modifications, permutations and variations will become apparent to those of ordinary skill in the art in light of the foregoing description. By way of example, other resistors and electronic components may be added to the thermally stabilized device even though they do not participate in thermal control (as described above). In so doing these devices will gain the advantage of operation at a constant temperature increment above ambient. It is assumed of course that their power dissipation is negligible as regards the thermal control described above. Many other variations are also possible. Accordingly, it is intended that the present invention embrace all such alternatives, modifications and variations as fall within the scope of the appended claims.

What is claimed is:

1. A method for maintaining a constant temperature for each of one or more input signal resistors of a thermally stabilized device, comprising:
    determining a total input signal power dissipated in a totality of one or more input signal resistors of the thermally stabilized device;
    dissipating total power on a totality of one or more input power resistors of the thermally stabilized device as determined by a power constant less the total input signal power; and
    providing a low thermal resistance path between the one or more input signal resistors and the one or more input power resistors, wherein one or more input power signals provided to corresponding ones of the one or more input power resistors operate to prevent unacceptable changes in resistance in each of said resistors and to maintain operational temperatures of each of said resistors to be substantially constant.

2. The method of claim 1, further comprising forming the one or more input signal resistors and the one or more input power resistors on a common substrate.

3. The method of claim 1, wherein the low thermal resistance path comprises any of a thermal compound, a heat sink, a substrate, and a physical contact connection.

\* \* \* \* \*